US007171868B2

(12) United States Patent
Buckman et al.

(10) Patent No.: US 7,171,868 B2
(45) Date of Patent: Feb. 6, 2007

(54) BEARING ASSEMBLY

(75) Inventors: Kenneth J. Buckman, Branford, CT (US); Michael F. Mullen, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 200 days.

(21) Appl. No.: 10/894,596

(22) Filed: Jul. 20, 2004

(65) Prior Publication Data

US 2006/0018581 A1 Jan. 26, 2006

(51) Int. Cl.
*F16H 1/06* (2006.01)
*F16C 33/38* (2006.01)

(52) U.S. Cl. ........................................ 74/413; 384/523

(58) Field of Classification Search ................ 384/523, 384/572; 74/810.1, 333, 325, 413; 244/60; 192/45
See application file for complete search history.

(56) References Cited

U.S. PATENT DOCUMENTS

| | | | | |
|---|---|---|---|---|
| 2,711,938 | A * | 6/1955 | Herrmann | 384/572 |
| 3,380,564 | A * | 4/1968 | Beurer | 192/45 |
| 3,942,387 | A | 3/1976 | Stone et al. | |
| 4,040,686 | A * | 8/1977 | F'Geppert | 384/527 |
| 4,659,286 | A | 4/1987 | Garavaglia et al. | |
| 5,807,202 | A | 9/1998 | Sammataro | |
| 6,042,499 | A | 3/2000 | Goi et al. | |
| 6,102,822 | A * | 8/2000 | Nakazeki | 384/523 |
| 6,170,993 | B1 * | 1/2001 | Hurrell et al. | 384/572 |
| 6,676,073 | B2 | 1/2004 | Thomassey | |
| 6,779,419 | B2 * | 8/2004 | Yamaguchi | 384/51 |

* cited by examiner

*Primary Examiner*—Thomas R. Hannon
(74) *Attorney, Agent, or Firm*—Carlson, Gaskey & Olds

(57) ABSTRACT

A bearing assembly which spaces bearing elements in an unequal relationship from one bearing element pocket to the next. The spacing minimizes the likelihood that the bearing elements will rest in the exact same location on an inner and outer race to reduce the potential for false brinelling. The net result is a decreased depth of false brinelling in any one location and an increased bearing life.

4 Claims, 6 Drawing Sheets

| BASELINE | | | FIG. 3A | | | | | | FIG. 3B | | | | |
|---|---|---|---|---|---|---|---|---|---|---|---|---|---|
| Standard Bearing spacing for 18 rolling elements | | | Modified bearing spacing for the same bearing now 16 elements | | | | | | Alternate modified bearing spacing for the same bearing with 18 elements | | | | |
| Element number | Angle | | | Adjacent Spacing Increment | Cumulative Increment | Angle | Resultant Spacing Angle | | | Adjacent Spacing Increment | Cumulative increment | Angle | Resultant Spacing Angle |
| 1 | 20 | | 1 | | | 20.000 | 20.000 | | 1 | 0 | 0 | 17.778 | 17.778 |
| 2 | 40 | | 2 | 1 | 1 | 40.238 | 20.238 | | 2 | 1 | 1 | 36.222 | 18.444 |
| 3 | 60 | | 3 | 2 | 3 | 60.952 | 20.714 | | 3 | 2 | 3 | 56.000 | 19.778 |
| 4 | 80 | | 4 | 3 | 6 | 82.381 | 21.429 | | 4 | 3 | 6 | 77.778 | 21.778 |
| 5 | 100 | | 5 | 4 | 10 | 104.762 | 22.381 | | 5 | 4 | 10 | 102.222 | 24.444 |
| 6 | 120 | | 6 | 5 | 15 | 128.333 | 23.571 | | 6 | 4 | 6 | 124.000 | 21.778 |
| 7 | 140 | | 7 | 6 | 21 | 153.333 | 25.000 | | 7 | 3 | 3 | 143.778 | 19.778 |
| 8 | 160 | | 8 | 7 | 28 | 180.000 | 26.667 | | 8 | 2 | 1 | 162.222 | 18.444 |
| 9 | 180 | | 9 | | | 200.000 | 20.000 | | 9 | 1 | 0 | 180.000 | 17.778 |
| 10 | 200 | | 10 | 1 | 1 | 220.238 | 20.238 | | 10 | 0 | 0 | 197.778 | 17.778 |
| 11 | 220 | | 11 | 2 | 3 | 240.952 | 20.714 | | 11 | 1 | 1 | 216.222 | 18.444 |
| 12 | 240 | | 12 | 3 | 6 | 262.381 | 21.429 | | 12 | 2 | 3 | 236.000 | 19.778 |
| 13 | 260 | | 13 | 4 | 10 | 284.762 | 22.381 | | 13 | 3 | 6 | 257.778 | 21.778 |
| 14 | 280 | | 14 | 5 | 15 | 308.333 | 23.571 | | 14 | 4 | 10 | 282.222 | 24.444 |
| 15 | 300 | | 15 | 6 | 21 | 333.333 | 25.000 | | 15 | 4 | 6 | 304.000 | 21.778 |
| 16 | 320 | | 16 | 7 | 28 | 360.000 | 26.667 | | 16 | 3 | 3 | 323.778 | 19.778 |
| 17 | 340 | | | | | | | | 17 | 2 | 1 | 342.222 | 18.444 |
| 18 | 360 | | | | 84 | | | | 18 | 1 | 0 | 360.000 | 17.778 |
| | | | | | | | | | | | | | |
| | | | | | | | | | | | 30 | | |

FIG. 3C

| Standard Bearing spacing for 36 rolling elements | | | Modified bearing spacing for the same bearing now 34 elements | | | | | Alternate modified bearing spacing for the same bearing with 36 elements | | | | | |
|---|---|---|---|---|---|---|---|---|---|---|---|---|---|
| Element number | Angle | | | Adjacent Spacing Increment | Cumulative Increment | Angle | Resultant Spacing Angle | | | Adjacent Spacing Increment | Cumulative increment | Angle | Resultant Spacing Angle |
| 1 | 10 | | 1 | | | 10.000 | 10.000 | | 1 | 1 | 1 | 9.480 | 9.480 |
| 2 | 20 | | 2 | 1 | 1 | 20.012 | 10.012 | | 2 | 2 | 3 | 19.029 | 9.550 |
| 3 | 30 | | 3 | 2 | 3 | 30.049 | 10.037 | | 3 | 3 | 6 | 28.684 | 9.655 |
| 4 | 40 | | 4 | 3 | 6 | 40.123 | 10.074 | | 4 | 4 | 10 | 38.480 | 9.795 |
| 5 | 50 | | 5 | 4 | 10 | 50.245 | 10.123 | | 5 | 5 | 15 | 48.450 | 9.971 |
| 6 | 60 | | 6 | 5 | 15 | 60.429 | 10.184 | | 6 | 6 | 21 | 58.632 | 10.181 |
| 7 | 70 | | 7 | 6 | 21 | 70.686 | 10.257 | | 7 | 7 | 28 | 69.058 | 10.427 |
| 8 | 80 | | 8 | 7 | 28 | 81.029 | 10.343 | | 8 | 8 | 36 | 79.766 | 10.708 |
| 9 | 90 | | 9 | 8 | 36 | 91.471 | 10.441 | | 9 | 9 | 45 | 90.789 | 11.023 |
| 10 | 100 | | 10 | 9 | 45 | 102.022 | 10.551 | | 10 | 9 | 36 | 101.497 | 10.708 |
| 11 | 110 | | 11 | 10 | 55 | 112.696 | 10.674 | | 11 | 8 | 28 | 111.924 | 10.427 |
| 12 | 120 | | 12 | 11 | 66 | 123.505 | 10.809 | | 12 | 7 | 21 | 122.105 | 10.181 |
| 13 | 130 | | 13 | 12 | 78 | 134.461 | 10,958 | | 13 | 6 | 15 | 132.076 | 9.971 |
| 14 | 140 | | 14 | 13 | 91 | 145.576 | 11.115 | | 14 | 5 | 10 | 141.871 | 9.795 |
| 15 | 150 | | 15 | 14 | 105 | 156.863 | 11.287 | | 15 | 4 | 6 | 151.526 | 9.655 |
| 16 | 160 | | 16 | 15 | 120 | 168.333 | 11.471 | | 16 | 3 | 3 | 161.076 | 9.550 |
| 17 | 170 | | 17 | 16 | 136 | 180.000 | 11.667 | | 17 | 2 | 1 | 170.556 | 9.480 |
| 18 | 180 | | 18 | | | 190.000 | 10.000 | | 18 | 1 | 0 | 180.000 | 9.444 |
| 19 | 190 | | 19 | 1 | 1 | 200.012 | 10.012 | | 19 | 1 | 1 | 189.480 | 9.480 |
| 24 | 200 | | 20 | 2 | 3 | 210.049 | 10.037 | | 24 | 2 | 3 | 199.029 | 9.550 |
| 21 | 210 | | 21 | 3 | 6 | 220.123 | 10.074 | | 21 | 3 | 6 | 208.684 | 9.655 |
| 22 | 220 | | 22 | 4 | 10 | 230.245 | 10.123 | | 22 | 4 | 10 | 218.480 | 9.795 |
| 23 | 230 | | 23 | 5 | 15 | 240.429 | 10.184 | | 23 | 5 | 15 | 228.450 | 9.971 |
| 24 | 240 | | 24 | 6 | 21 | 250.686 | 10.257 | | 24 | 6 | 21 | 238.632 | 10.181 |
| 25 | 250 | | 25 | 7 | 28 | 261.029 | 10.343 | | 25 | 7 | 28 | 249.058 | 10.427 |
| 26 | 260 | | 26 | 8 | 36 | 271.471 | 10.441 | | 26 | 8 | 36 | 259.766 | 10.708 |
| 27 | 270 | | 27 | 9 | 45 | 282.022 | 10.551 | | 27 | 9 | 45 | 270.789 | 11.023 |
| 28 | 280 | | 28 | 10 | 55 | 292.696 | 10.674 | | 28 | 9 | 36 | 281.497 | 10.708 |
| 29 | 290 | | 29 | 11 | 66 | 303.505 | 10.809 | | 29 | 8 | 28 | 291.924 | 10.427 |
| 30 | 300 | | 30 | 12 | 78 | 314.461 | 10.956 | | 30 | 7 | 21 | 302.105 | 10.181 |
| 31 | 310 | | 31 | 13 | 91 | 325.576 | 11.115 | | 31 | 6 | 15 | 312.076 | 9.971 |
| 32 | 320 | | 32 | 14 | 105 | 336.863 | 11.287 | | 32 | 5 | 10 | 321.871 | 9.795 |
| 33 | 330 | | 33 | 15 | 120 | 348.333 | 11.471 | | 33 | 4 | 6 | 331.526 | 9.655 |
| 34 | 340 | | 34 | 16 | 136 | 360.000 | 11.667 | | 34 | 3 | 3 | 341.076 | 9.550 |
| 35 | 350 | | | | | | | | 35 | 2 | 1 | 350.556 | 9.480 |
| 36 | 360 | | | | 816 | | | | 36 | 1 | 0 | 360.000 | 9.444 |
| | | | | | | | | | | 285 | | | |

FIG. 4

BEARING ASSEMBLY

BACKGROUND OF THE INVENTION

The present invention relates to a bearing assembly, and more particularly to a bearing assembly with a bearing element spacing orientation which minimizes false brinelling.

Rotary wing aircraft commonly utilize freewheel bearing systems to maintain the momentum of the rotor system. A freewheel bearing system operates when the engine speed is lower that the rotor speed. When the engine drives the rotor system, the bearing races of the freewheel bearing system are stationary relative to each other such that the bearing elements do not revolve relative the races. The bearing races and bearing elements rotate as a unit and are subject to gear loads. This condition may create a condition in which false brinelling of the raceways occurs.

False brinelling is the indentation of a part where the indented material has been worn away. False brinelling is typically a wear issue due to metal-to-metal contact and may be exacerbated by external vibration. False brinelling tends to deepen in one location because the bearing elements tend to settle in the location of a previous false brinelling event. False brinelling increases drag which may prevent the engine from freely spinning at shut down which may increase engine maintenance concerns.

Accordingly, it is desirable to provide a bearing assembly which minimizes false brinelling.

SUMMARY OF THE INVENTION

The bearing assembly according to the present invention spaces bearing elements in an unequal relationship from one bearing element pocket to the next according to the relationship: Si=T multiplied by Ni multiplied by an increment U. The unequal spacing minimizes the likelihood that the bearing elements will rest in the exact same location on an inner and outer race to reduce the potential for false brinelling. The present invention therefore provides a bearing assembly that minimizes false brinelling.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3C is a chart of bearing element positions for the 16 and 18 bearing element bearing assembly of FIGS. 3A and 3B respectively in comparison to a baseline equally spaced 18 bearing element bearing assembly; and FIG. 4 is a chart of bearing element positions for a 34 and 36 bearing element bearing assembly in comparison to a baseline, equally spaced bearing assembly.

DETAILED DESCRIPTION OF THE PREFERRED EMBODIMENT

Figure 1:
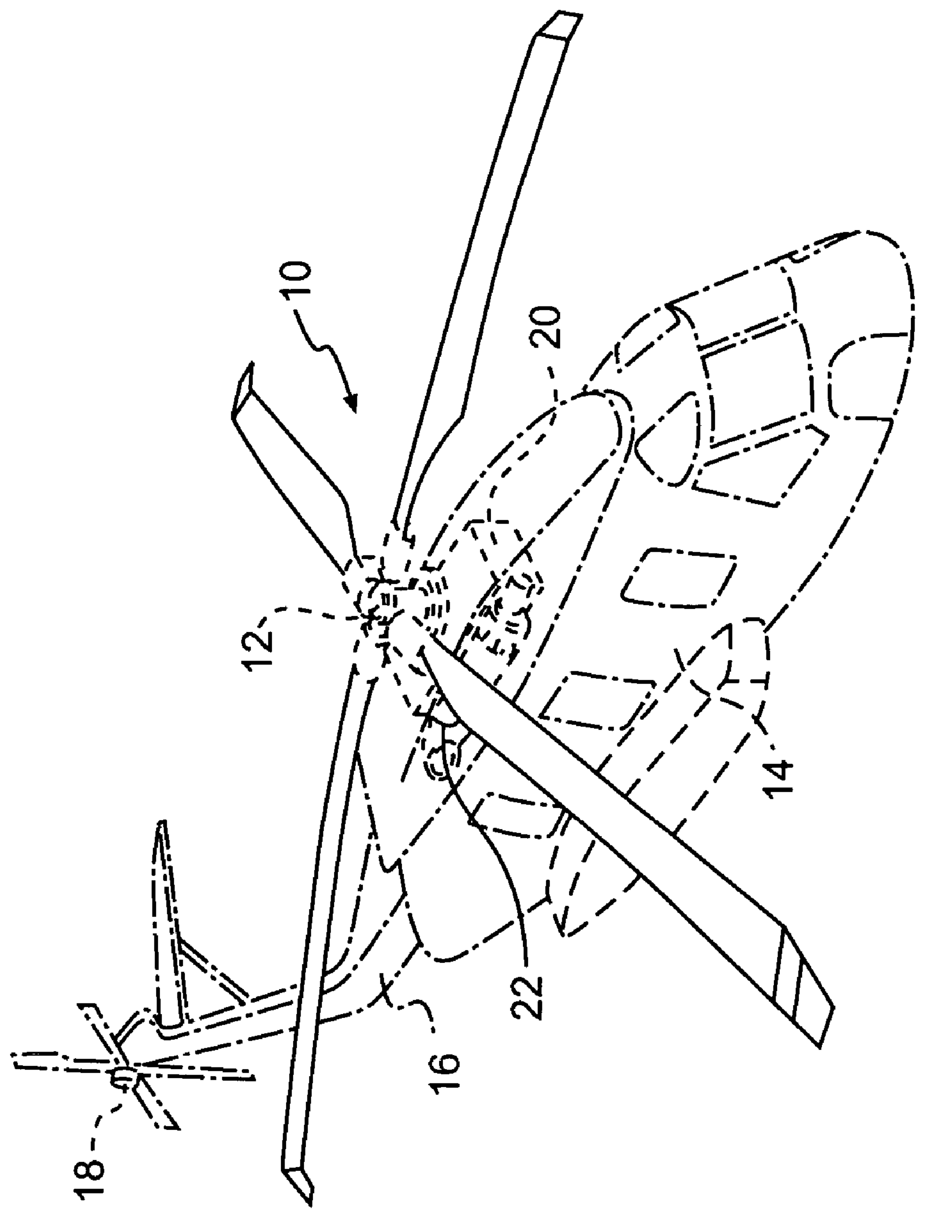
FIG. 1 is a general perspective view of an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
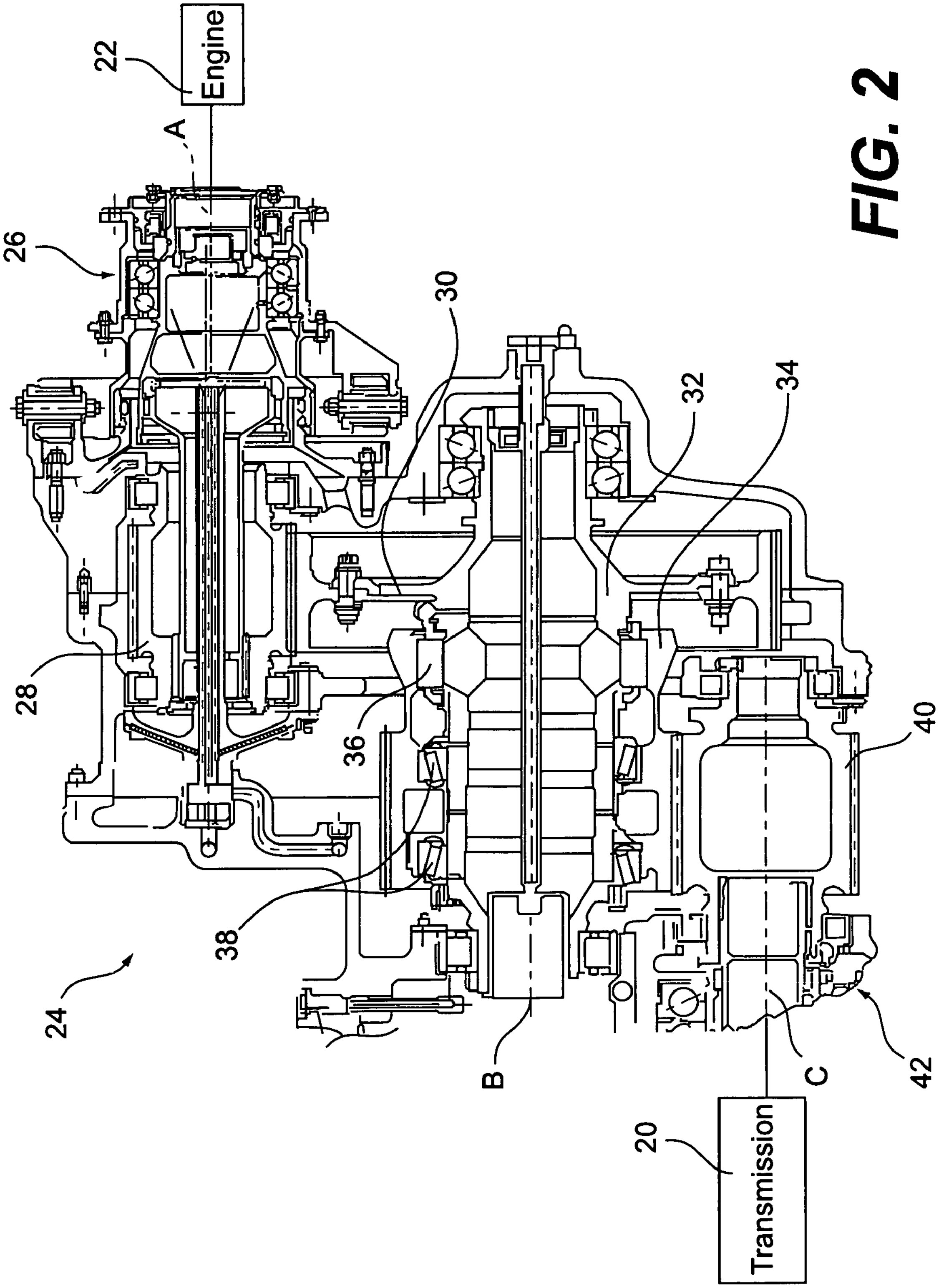
FIG. 2 is a sectional view of a free wheel unit for use with the present invention.

Referring to FIG. 2, a freewheel unit 24 for a rotary wing aircraft is illustrated. The freewheel unit 24 is typically located between the engine 22 (illustrated schematically) and the transmission 20 (illustrated schematically) which drives the main rotor assembly 12 (FIG. 1). It should be understood that although a system arrangement is disclosed in the illustrated embodiment, other arrangements including non-aircraft related systems will benefit from the instant invention.

The freewheel unit 24 generally includes an engine input gimbal 26 which drives an input gear 28 about an input axis A. The input gear 28 is in meshing engagement with a bullgear 30 which rotates with a camshaft 32 about a second axis B. The camshaft 32 is located within an integrated drive housing gear 34. The integrated drive housing gear 34 is supported for relative rotation to the camshaft 32 through a clutch roller 36 and a bearing assembly 38 (two shown). The integrated drive housing gear 34 is in meshing engagement with a driven pinion 40 which rotates about a third axis C. The driven pinion 40 drives the transmission 20 through an output gimbal 42.

The clutch roller 36 reacts with inclined surfaces on either or both of the integrated drive housing gear 34 and/or the camshaft 32 to lock the clutch roller 36 to provide a driving engagement between the integrated drive housing gear 34 and the camshaft 32 when the input gear 28 is being driven faster than the driven pinion 40.

In operation, power is transmitted from the engine 22 to drive the input gear 28 and the bull gear 30. Power is transmitted across the locked clutch roller 36 such that the camshaft 32 drives the integrated drive housing gear 34 and the driven pinion 40. The drive pinion 40 drives the transmission 20 through the output gimbal 42. It should be understood that additional gear arrangements may alternatively or additionally be provided.

With the engine 22 operating below the rotational speed of the rotor system 12, such as during an autorotation or engine shutdown, the clutch roller 36 will be unlocked and the camshaft 32 will rotate relative the drive housing gear 34. The input gear 28 will drive the bullgear 30, but the camshaft 32 will rotate within the drive housing gear 34 upon the bearing assembly 38 which disconnects the engine 22 from the transmission 20 as generally understood.

Figure 3A:
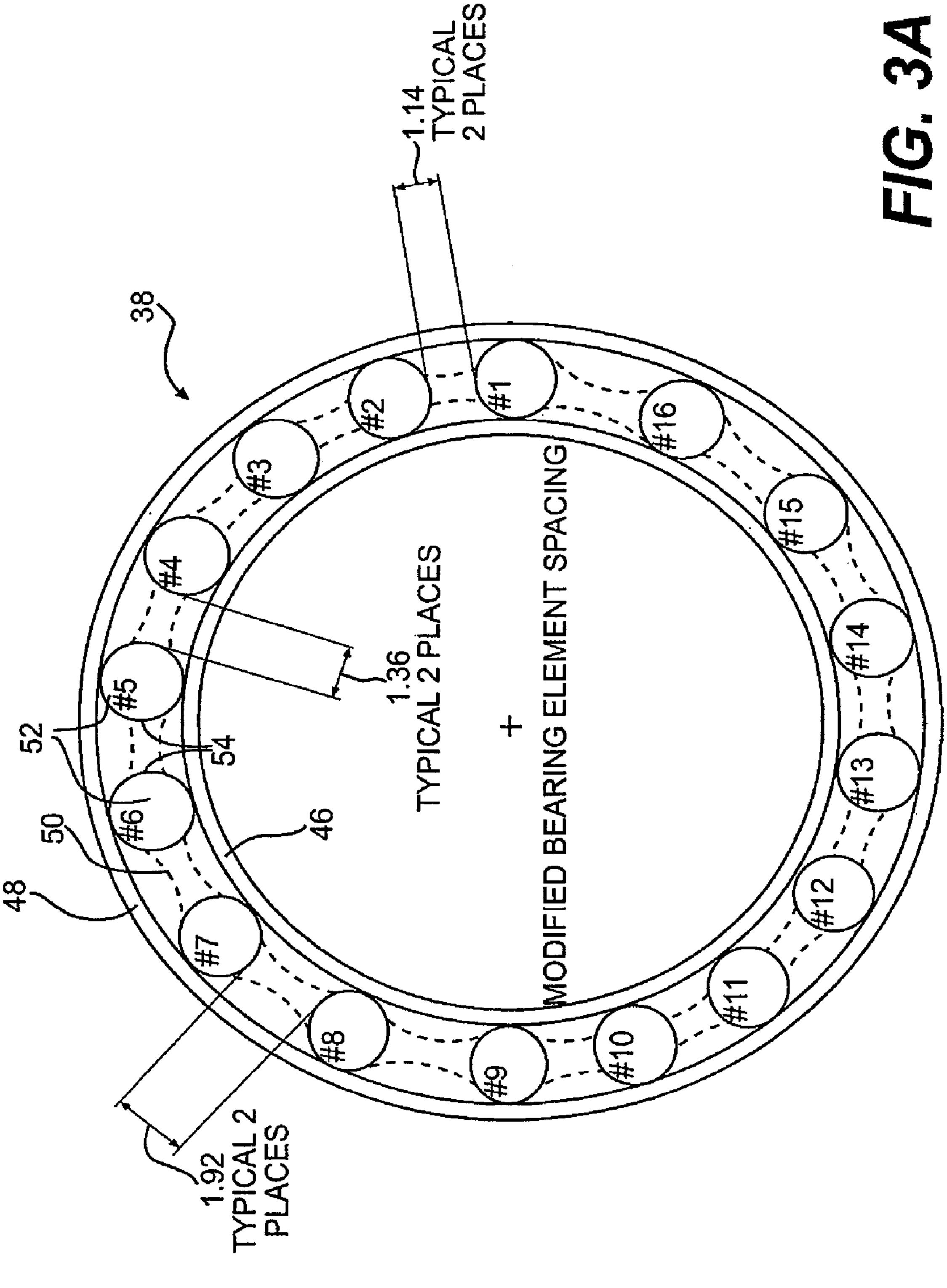
FIG. 3A is a plan view of a 16 bearing element bearing assembly according to the present invention.

Referring to FIG. 3A, the bearing assembly 38 is illustrated in a plan view. The bearing assembly 38 includes an inner race 46, an outer race 48, a cage 50 and a multiple of bearing elements 52. The cage 50 includes a multiple of pockets 54 which maintain the relative position between the bearing elements 52. It should be understood that various bearing elements, such as ball, pins, rollers and such may be utilized with the present invention. It should be further understood that independent spacers and individual retainers for the bearing elements other then a cage such as separate spacers may also be utilized with the present invention.

The cage 50 spaces the bearing elements 52 such that the bearing elements 52 are not equally spaced. The unequal spacing minimizes likelihood that the bearing elements 52 will rest in the exact same location on the inner race 46 and the outer race 48 to reduce the potential for false brinelling. The net result is a decreased depth of false brinelling in any one location and an increased bearing life.

The bearing assembly 38, although having unequal spacing between the bearing elements 52 is preferably divided into sectors in which the bearing element relative spacing is repeated such that the bearing system 24 is circumferentially balanced to prevent the inducement of vibration to the system in which the bearing assembly 38 is installed.

Preferably, the bearing spacing Si is described by the formula:

$$Si=T*Ni*U \quad [1]$$

where U is a small increment.

Referring to FIG. 3C, a chart of the bearing element 52 positions for a 16 and an 18 bearing element bearing assembly 38, 38' as compared to a conventional equally spaced 18 bearing element bearing assembly is detailed.

The cage web thickness T is increasing from one pocket to the next such that the spacing therebetween is defined by Formula [1] in the first 180 degrees of the cage 50 such that the bearing elements 52 are spaced by the cage 50 with an increasing distance between each bearing element 52. In the next 180 degrees, the bearing elements 52 spacing repeats so that the cage pockets 54 are directly opposite each other and balanced.

Figure 3B:
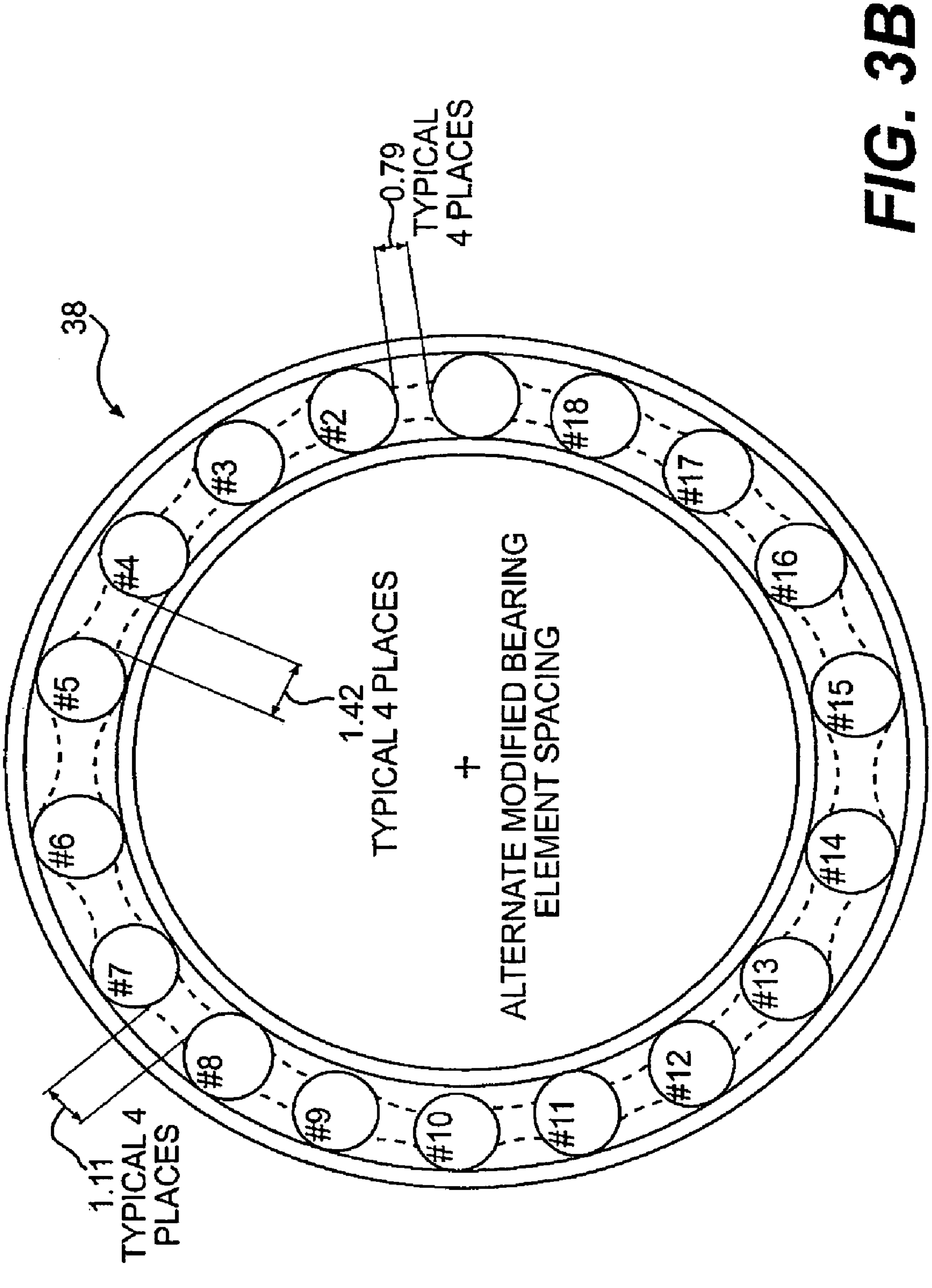
FIG. 3B is a plan view of an 18 bearing element bearing assembly according to the present invention.

A baseline bearing has an original cage pocket spacing value. This value provides the cage web thickness. If the cage web thickness is sufficient to allow a thinner web, the invention may result in a redesigned bearing with the same number of rolling elements (FIG. 3B). If the web thickness cannot be reduced from the current value, the redesigned bearing would have fewer elements (FIG. 3A). That is, the 16 bearing element bearing assembly 38 utilizes the space of the two bearings (one from each hemi-circumference) to provide a resulting spacing angle close to the standard 18 bearing element bearing system. The 18 bearing element bearing assembly 38' (FIG. 3B) more closely spaces the resulting spacing angle than the standard 18 bearing element bearing.

Once the desired number of bearing elements 52 and minimum cage thickness is selected, the bearing element 52 (cage pocket) spacing is determined. Each adjacent spacing increment (cage pocket spacing increment) changes by an increasing factor of 1, 2, 3, 4, etc., and the "cumulative spacing increment" is the sum of the current pocket location and the previous "adjacent pocket increments", i.e., for the second pocket, the increment is 1, for the third pocket the increment is 3 (2+1), and so on.

The "clock angle" for each bearing element 52 is determined by the sum of the original pocket location and all the subsequent next pocket locations "cumulative spacing increment". That is, the clock angle=n times the original pocket clock angle plus the cumulative spacing increment.

For the 16 bearing element bearing system, the bearing elements 52 in the first 180 degrees of the circumference define increased spacing between each adjacent bearing element 52 which is then repeated for the second 180 degrees of the circumference. That is, the incremental spacing is repeated for each half of the bearing assembly 38.

Bearing assembly 38' provides closer spaced bearing elements relative to the conventional bearing assembly. For bearing assembly 38', the bearing elements 54 increase in spacing through the first 90 degree sector of the bearing circumference and decrease for the second 90 degree sector of the bearing circumference in each half circumference so as to accommodate all 18 bearing elements. Notably, the bearing elements 54 are mirrored through each 180 degree sector. That is, the first 90 degree sector has the spacing increase and the next 90 degree sector has the spacing decrease by the same increments.

It should be understood that any number of bearing elements will benefit from the present invention such as a 34 and 36 bearing element bearing system (FIG. 4).

It should be understood that although a particular component arrangement is disclosed in the illustrated embodiment, other arrangements will benefit from the instant invention. Also, any bearing element style, materials and finishing practices will benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A free wheel unit for a rotary wing aircraft comprising:
- an engine input gimbal;
- an input gear driven about an input axis by said engine input gimbal;
- a bull gear which rotates about a second axis, said bull gear in meshing engagement with said input gear;
- a cam shaft driven by said bull gear;
- an integrated drive housing gear supported for relative rotation to said cam shaft through a clutch roller and a bearing assembly, said bearing assembly comprising
  - an inner race;
  - an outer race; and
  - a multiple of bearing elements between said inner race and said outer race, said multiple of bearing elements including a first multiple of bearing elements in which each of the first multiple of bearing elements are spaced by a different resultant spacing angle therebetween and a second multiple of bearing elements in which each of the second multiple of bearing elements are spaced by the different resulting spacing angle which mirrors the different resultant spacing angle of said first multiple of bearing elements, said first multiple of bearing elements and said second multiple of bearing elements each defining a bearing spacing described by the formula: Si=T *Ni*U, where
    - T is a cage web thickness;
    - Ni is the bearing element number from an original bearing element; and
    - U is a predefined increment;
- a driven pinion which rotates about a third axis, said driven pinion in meshing engagement with said integrated drive housing gear; and
- an output gimbal driven by said driven pinion.

2. The free wheel unit for a rotary wing aircraft as recited in claim 1, wherein said clutch roller selectively provides a driving engagement between said integrated drive housing gear and said cam shaft when said input gear is driven faster than said driven pinion.

3. A rotary wing aircraft comprising:

a cam shaft;

an integrated drive housing gear supported for relative rotation to said cam shaft through a clutch roller and a bearing assembly, said bearing assembly comprising:

an inner race;

an outer race; and a multiple of bearing elements between said inner race and said outer race, said multiple of bearing elements including a first multiple of bearing elements in which each of the first multiple of bearing elements are spaced by a different resultant spacing angle therebetween and a second multiple of bearing elements in which each of the second multiple of bearing elements are spaced by the different resulting spacing angle which mirrors the different resultant spacing angle of said first multiple of bearing elements, said first multiple of bearing elements and said second multiple of bearing elements each defining a bearing spacing described by the formula: Si=T *Ni*U, where:

T is a cage web thickness;

Ni is the bearing element number from an original bearing element; and

U is a predefined increment;

a driven pinion in meshing engagement with said integrated drive housing gear;

a transmission driven through said driven pinion; and a main rotor assembly driven by said transmission, said clutch roller selectively providing a driving engagement between said integrated drive housing gear and said cam shaft when said cam shaft is driven faster than said driven pinion.

4. The rotary wing aircraft as recited in claim 1, further comprising:

an engine which drives said cam shaft through a gear arrangement.

* * * * *